(12) United States Patent
Uemura

(10) Patent No.: US 9,538,055 B2
(45) Date of Patent: Jan. 3, 2017

(54) LENS BARREL AND IMAGE PICKUP APPARATUS

(71) Applicant: CANON KABUSHIKI KAISHA, Tokyo (JP)

(72) Inventor: Kohei Uemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/832,134

(22) Filed: Aug. 21, 2015

(65) Prior Publication Data

US 2016/0065815 A1 Mar. 3, 2016

(30) Foreign Application Priority Data

Aug. 27, 2014 (JP) .................................. 2014-172545

(51) Int. Cl.
*H04N 5/262* (2006.01)
*H04N 5/225* (2006.01)
*G02B 7/10* (2006.01)
*H04N 5/232* (2006.01)

(52) U.S. Cl.
CPC .............. *H04N 5/2254* (2013.01); *G02B 7/10* (2013.01); *H04N 5/23293* (2013.01); *H04N 5/23296* (2013.01)

(58) Field of Classification Search
CPC ................................................... H04N 5/2254

USPC ...................................................... 348/240.99
See application file for complete search history.

(56) References Cited

U.S. PATENT DOCUMENTS

2005/0026659 A1* 2/2005 Yang .................... H04M 1/0264
455/575.3
2007/0242940 A1* 10/2007 Yumiki ..................... G02B 7/02
396/79

FOREIGN PATENT DOCUMENTS

JP 2012-042578 A 3/2012

* cited by examiner

*Primary Examiner* — Usman Khan
(74) *Attorney, Agent, or Firm* — Cowan, Liebowitz & Latman, P.C.

(57) ABSTRACT

A lens barrel which is capable of securing excellent impact resistance of a lens barrel without increasing the lens barrel in size. A fixed barrel has a plurality of first projection or follower portions on an outer peripheral part thereof and having a flange portion on an object side-outer peripheral end thereof. A stopper member is fixedly arranged coaxially with the fixed barrel and has a plurality of second projection or follower portions. A cam barrel rotatingly moves in the optical axis direction. In an area where the cam barrel is extended to the object side and is close to the flange portion of the fixed barrel, side walls of the plurality of the second cam grooves with which the plurality of the second projection or follower portions are engaged, respectively, are open on the image surface side of the plurality of the second cam grooves.

8 Claims, 18 Drawing Sheets

LENS BARREL AND IMAGE PICKUP APPARATUS

BACKGROUND OF THE INVENTION

Field of the Invention

The present invention relates to a lens barrel mounted on an image pickup apparatus such as a digital camera, and to an image pickup apparatus.

Description of the Related Art

In a zoom type lens barrel mounted on an image pickup apparatus such as a digital camera, there is a tendency that because of an increase in the number of lenses of an image pickup optical system and an increase in the whole extension length accompanying a recent demand for higher image pickup magnification, the lens barrel is increasing in size in its optical axis direction, and the weight of the lens barrel is also increasing. If the weight of the lens barrel increases, a load imposed when an impact is given on the lens barrel also increases. Therefore, there is proposed a technique for preventing a cam barrel from falling, using a pin member fitted on a rectilinear motion barrel (see, e.g., Japanese Laid-Open Patent Publication (Kokai) No. 2012-42578).

In the above Japanese Laid-Open Patent Publication (Kokai) No. 2012-42578, however, it is necessary to form a wall portion for receiving the pin member in the optical axis direction relative to the cam barrel, and it is also necessary to form a hole portion for incorporating the pin member, which increases the cam barrel in size.

SUMMARY OF THE INVENTION

The present invention provides a lens barrel which is capable of securing excellent impact resistance of a lens barrel without increasing the lens barrel in size, and an image pickup apparatus.

In an aspect of the invention, there is provided a lens barrel that changes image pickup magnification by a lens moving in an optical axis direction of the lens barrel between a stored position and an image pickup position, the lens barrel comprising: a fixed barrel having a plurality of first projection or follower portions on an outer peripheral part thereof and having a flange portion on an object side-outer peripheral end thereof; a stopper member fixedly arranged coaxially with the fixed barrel and having a plurality of second projection or follower portions, each of which having flank surfaces at both ends thereof in the optical axis direction; and a cam barrel disposed on an outer peripheral side of the fixed barrel and the stopper member, having a plurality of first cam grooves with which the plurality of the first projection or follower portions are cam-engaged, respectively, on an inner peripheral part thereof, and having a plurality of second cam grooves, with which the plurality of the second projection or follower portions are engaged, respectively, on the inner peripheral part thereof, at a position toward an image surface side away from the first cam grooves in the optical axis direction, the plurality of second cam grooves having the same locus as that of the plurality of first cam grooves and rotatingly moving in the optical axis direction relative to the fixed barrel and the stopper member due to the engagement between the first projection or follower portions and the first cam grooves and the engagement between the second projection or follower portions and the second cam grooves, wherein in an area where the cam barrel is extended to the object side and is close to the flange portion of the fixed barrel, side walls of the plurality of the second cam grooves with which the plurality of the second projection or follower portions are engaged, respectively, are open on the image surface side of the plurality of the second cam grooves.

According to the present invention, it is possible to secure excellent impact resistance of a lens barrel without increasing the lens barrel in size.

Further features of the present invention will become apparent from the following description of exemplary embodiments with reference to the attached drawings.

DESCRIPTION OF THE EMBODIMENTS

An embodiment of the present invention will now be described in detail with reference to the attached drawings.

Figure 1:
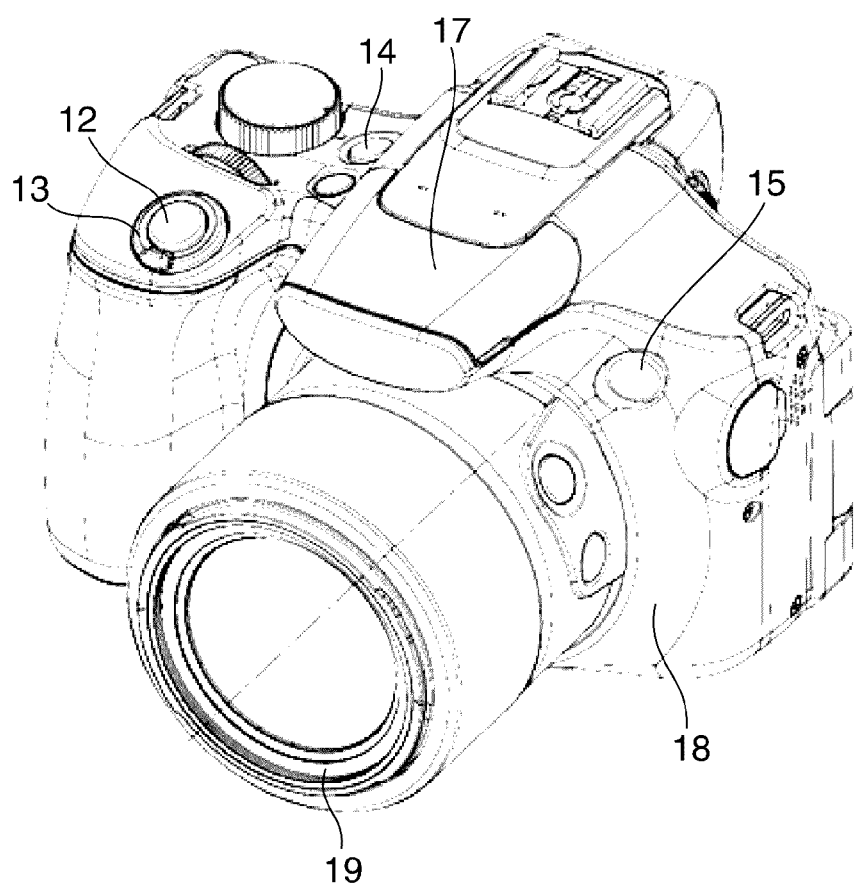
FIG. 1 is an external perspective view of a digital camera as an image pickup apparatus, when the digital camera is seen from a front side, provided with a lens barrel according to an embodiment of the present invention.
Figure 2:
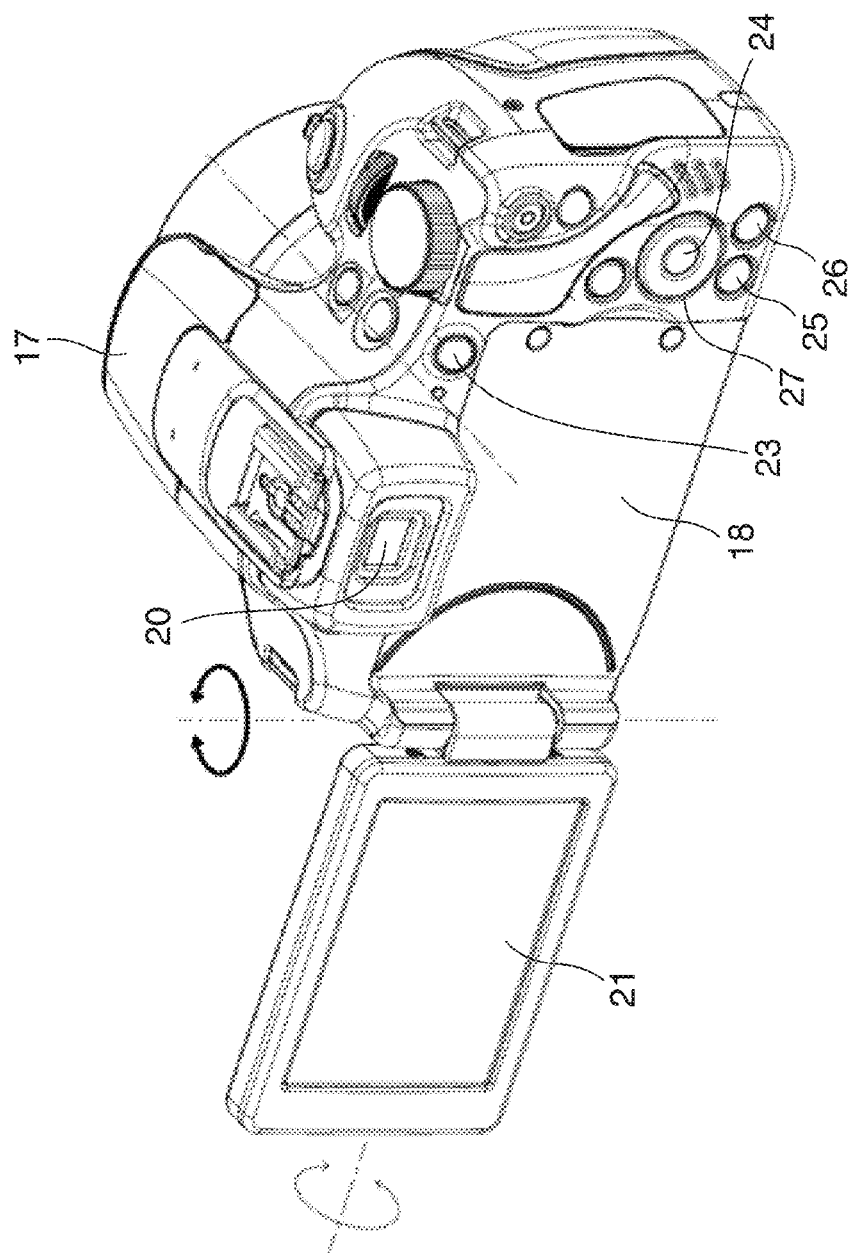
FIG. 2 is an external perspective view of the digital camera of FIG. 1 when the digital camera is seen from its back side.

FIG. 1 is an external perspective view of a digital camera as an image pickup apparatus, when the digital camera is seen from a front side, provided with a lens barrel according to an embodiment of the present invention. FIG. 2 is an external perspective view of the digital camera of FIG. 1 when the digital camera is seen from its back side.

The digital camera according to the embodiment of the present invention is provided with a camera body 18 which has an auxiliary light source window 15 and a lens barrel 19 on a front side of the camera body 18, as shown in FIG. 1. The lens barrel 19 is of a zoom type in which a lens is moved in an optical axis direction of the lens barrel 19 between a stored position and an image pickup position to change image pickup magnification. The camera body 18 has a release button 12, a power source switching button 14, a zoom switch 13, and a pop-up type strobe device 17 on a top surface portion of the camera body 18. Further, the camera body 18 has various kinds of operation buttons 23 to 27, a display 21 such as an LCD, and a finder eyepiece portion 20 on a back side of the camera body 18, as shown in FIG. 2. The display 21 is pivotally supported in open/close directions relative to the camera body 18 as well as rotatably supported in an open state of the display 12.

Figure 3:
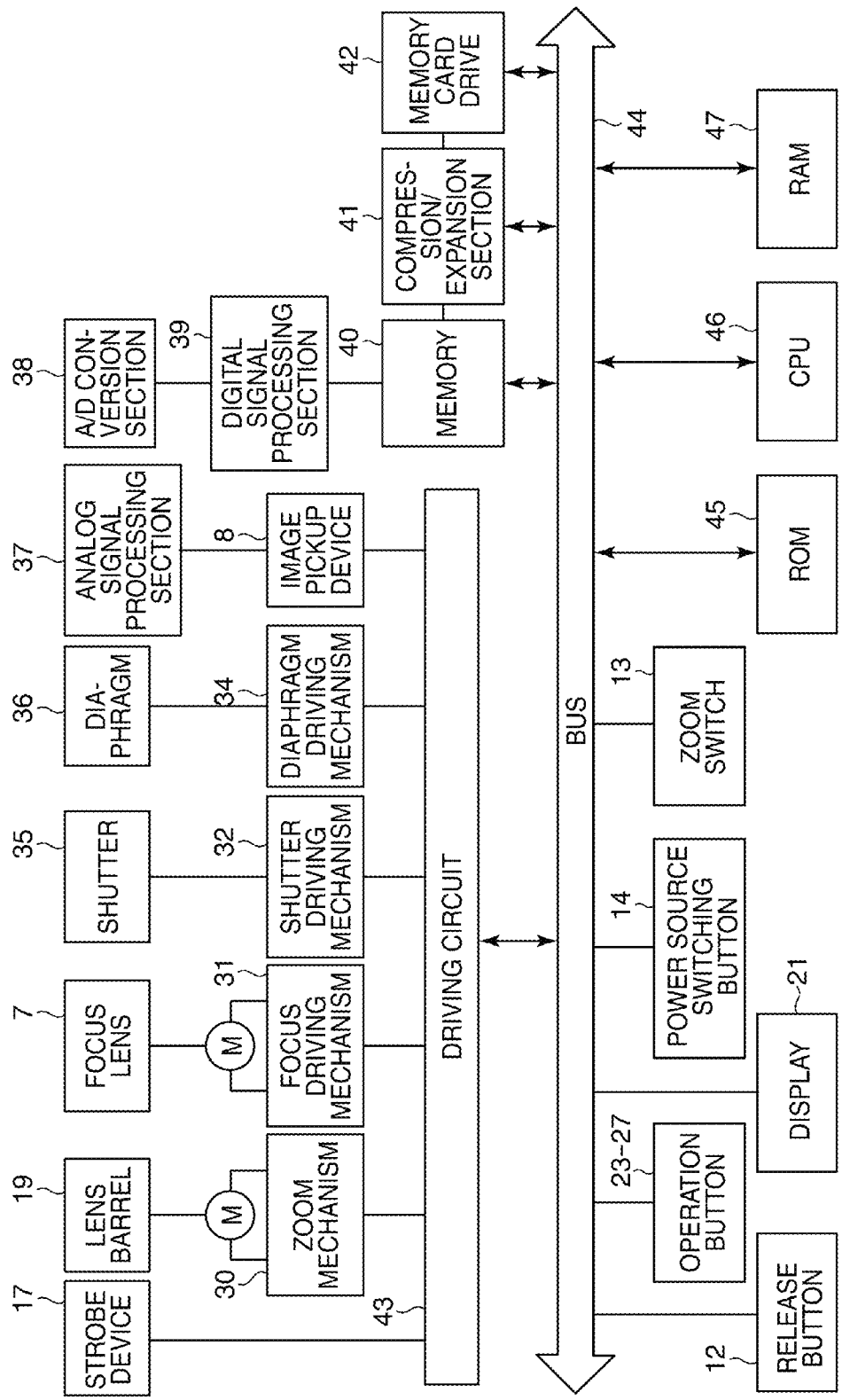
FIG. 3 is a control block diagram of the digital camera of FIG. 1.

FIG. 3 is a control block diagram of the digital camera of FIG. 1. To a bus 44 are connected a CPU 46, a ROM 45, a RAM 47, the release button 12, the operation buttons 23 to 27, the display 21, the power source switching button 14, the zoom switch 13, a memory 40, a compression/expansion section 41, a memory card drive 42, and a driving circuit 43.

To the driving circuit 43 are connected a zoom mechanism 30 for performing zoom driving of the lens barrel 19, a focus driving mechanism 31 for driving a focus lens 7, a shutter driving mechanism 32 for driving a shutter 35, and a diaphragm driving mechanism 34 for driving a diaphragm 36. Further, to the driving circuit 43 are connected an image pickup device 8 such as a CCD sensor or a CMOS sensor, and the strobe device 17. Driving of each unit connected to the driving circuit 43 is controlled via the driving circuit 43 on the basis of a signal from the CPU 46.

The ROM 45 stores various kinds of control programs or the like, and the RAM 47 stores data necessary for the various kinds of control programs. An analog signal processing section 37 implements analog processing of image data outputted from the image pickup device 8 and outputs the image data to an A/D conversion section 38. The A/D conversion section 38 converts the analog data taken from the image pickup device 8 to digital data and outputs the digital data to a digital signal processing section 39. The digital signal processing section 39 implements predetermined processing for the digital data converted by the A/D conversion section 38 and outputs the data to the memory 40 as image data.

After compression processing such as JPEG or TIFF is implemented for the image data stored in the memory 40 by the compression/expansion section 41 by operating the operation button 23, the image data is outputted to a memory card fitted in the memory card drive 42 and stored there. Further, it is possible to implement expansion processing of the image data stored in the memory 40 or the memory card by the compression/expansion section 41 and thereafter to display the data on the display 21 via the bus 44. When seeing an image displayed on the display 21 then judging that the image is unnecessary, a user can eliminate the image by operating the operating button 24.

Figure 4:
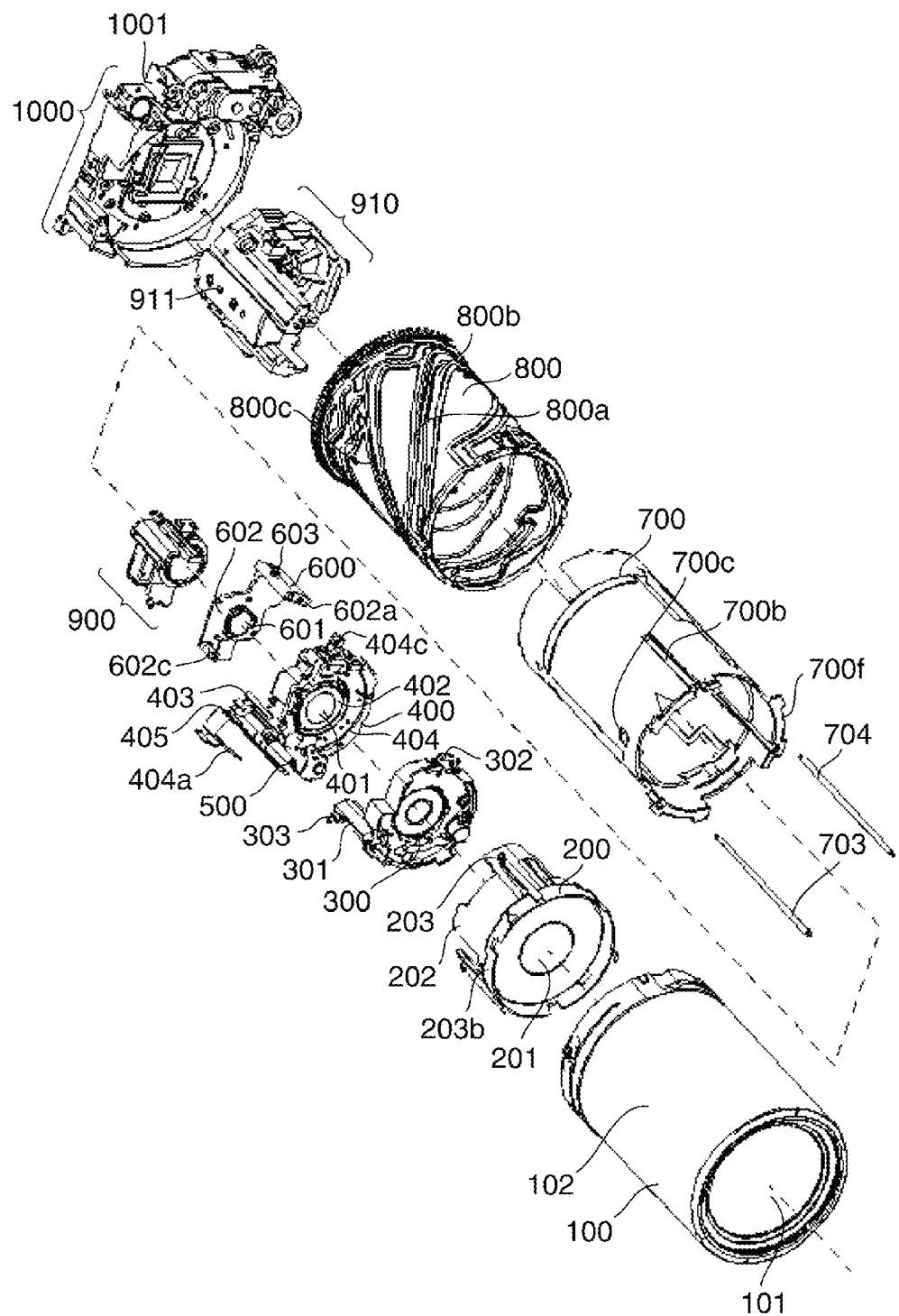
FIG. 4 is an exploded perspective view of a lens barrel of the digital camera of FIG. 1.
Figure 8:
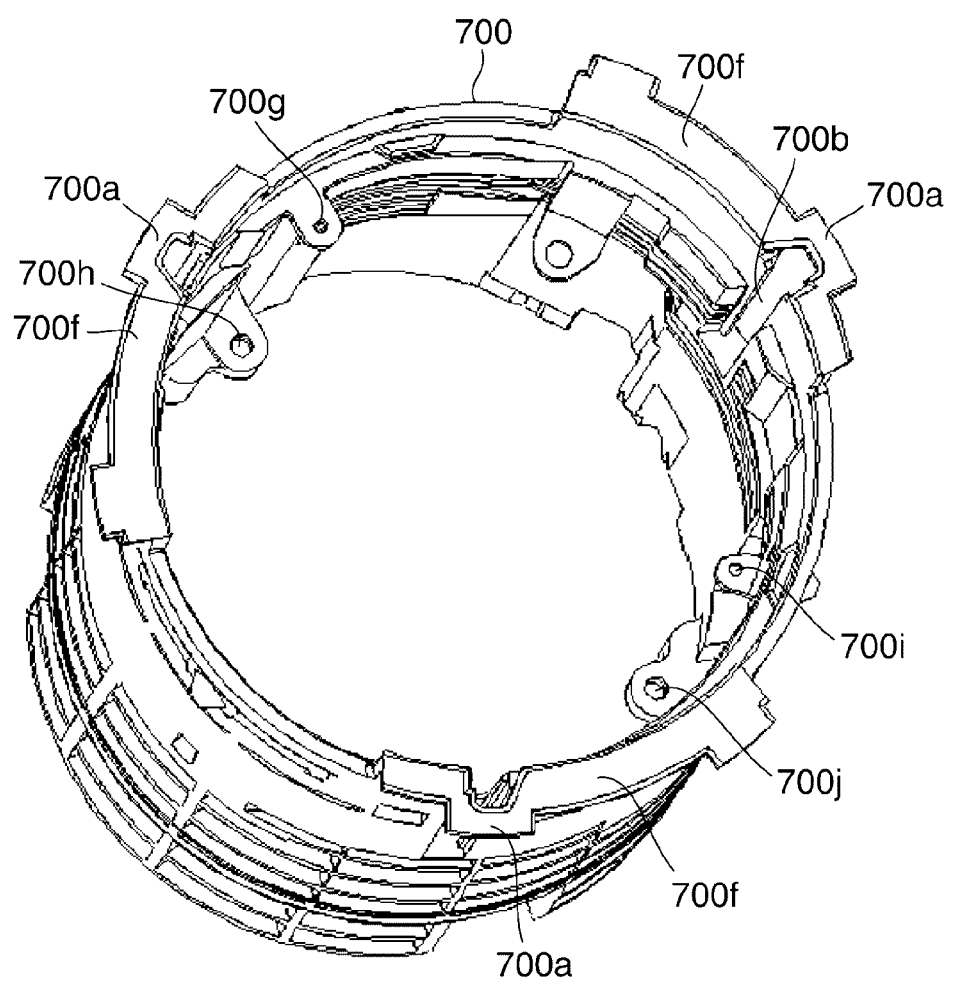
FIG. 8 is a perspective view of a fixed barrel in FIG. 4 when the fixed barrel is seen from an object side.
Figure 9:
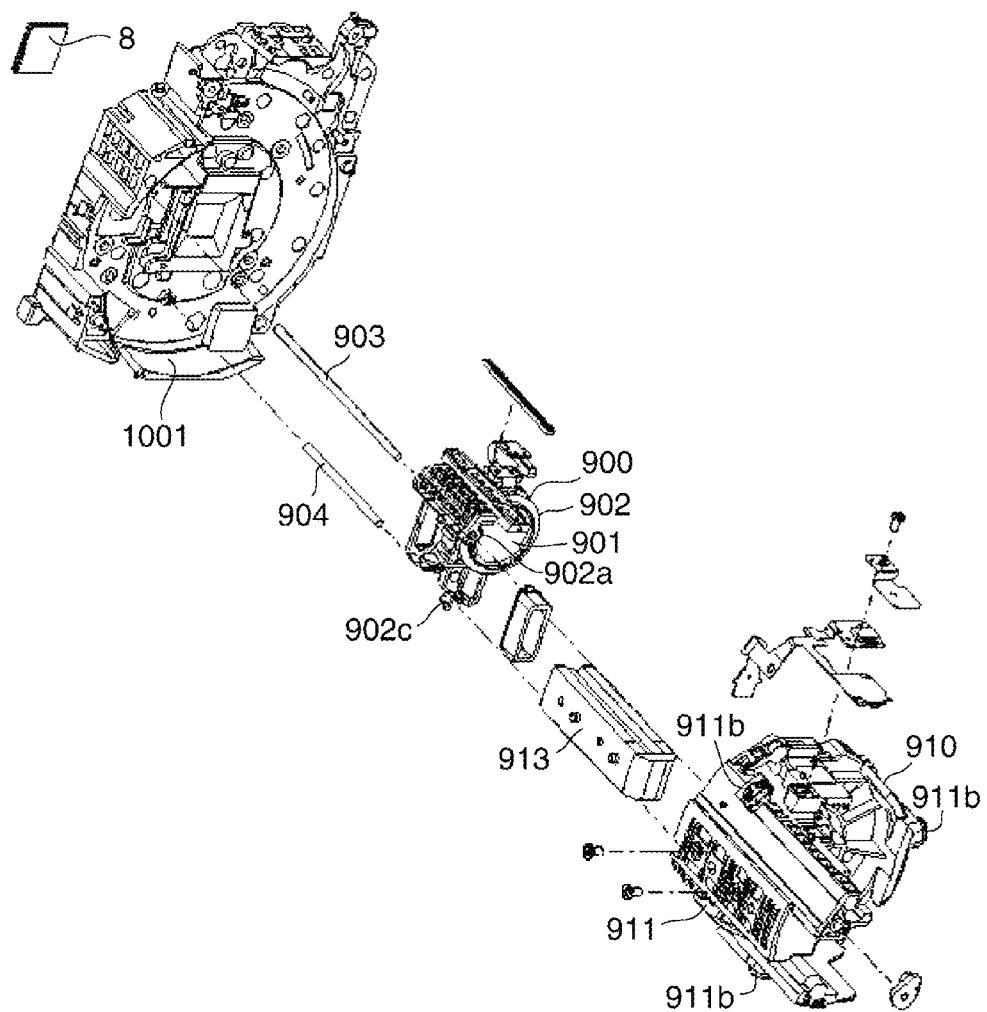
FIG. 9 is an exploded perspective view of a fifth group base unit in FIG. 4.
Figure 10:
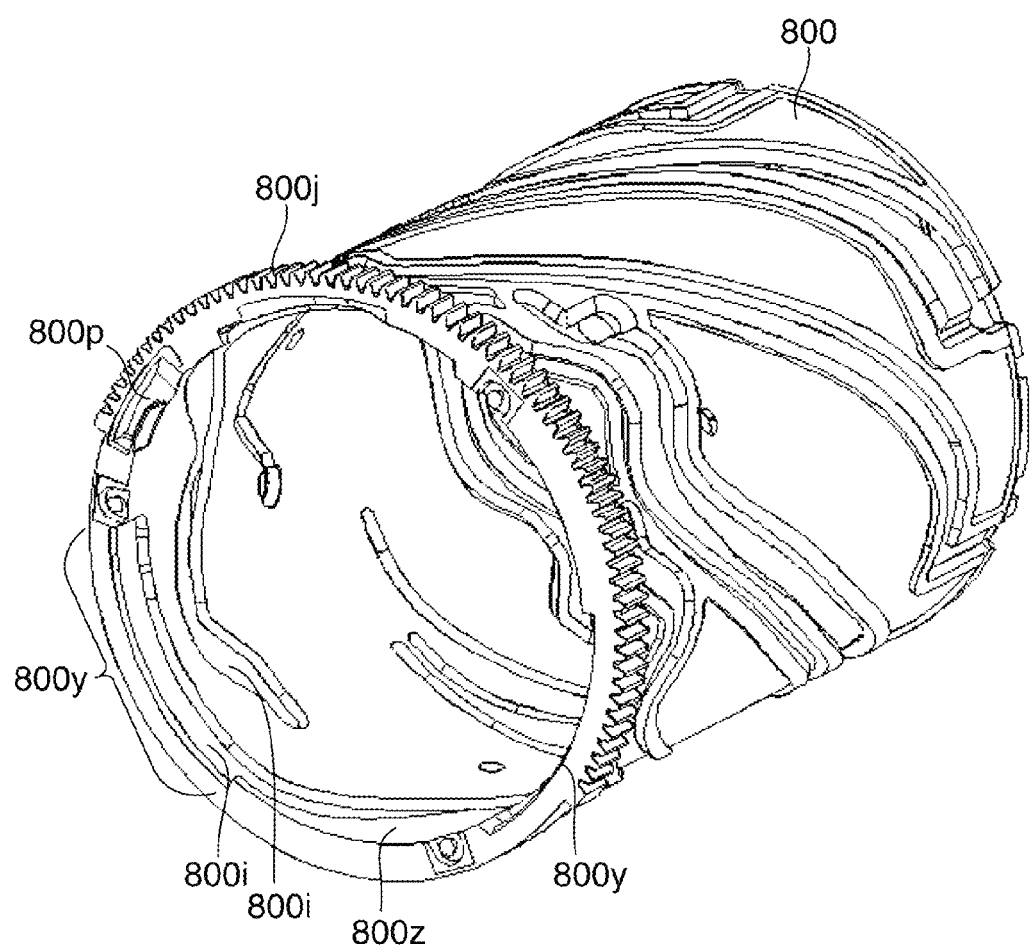
FIG. 10 is a perspective view of a cam barrel in FIG. 4 when the cam barrel is seen from the image surface side.
Figure 11:
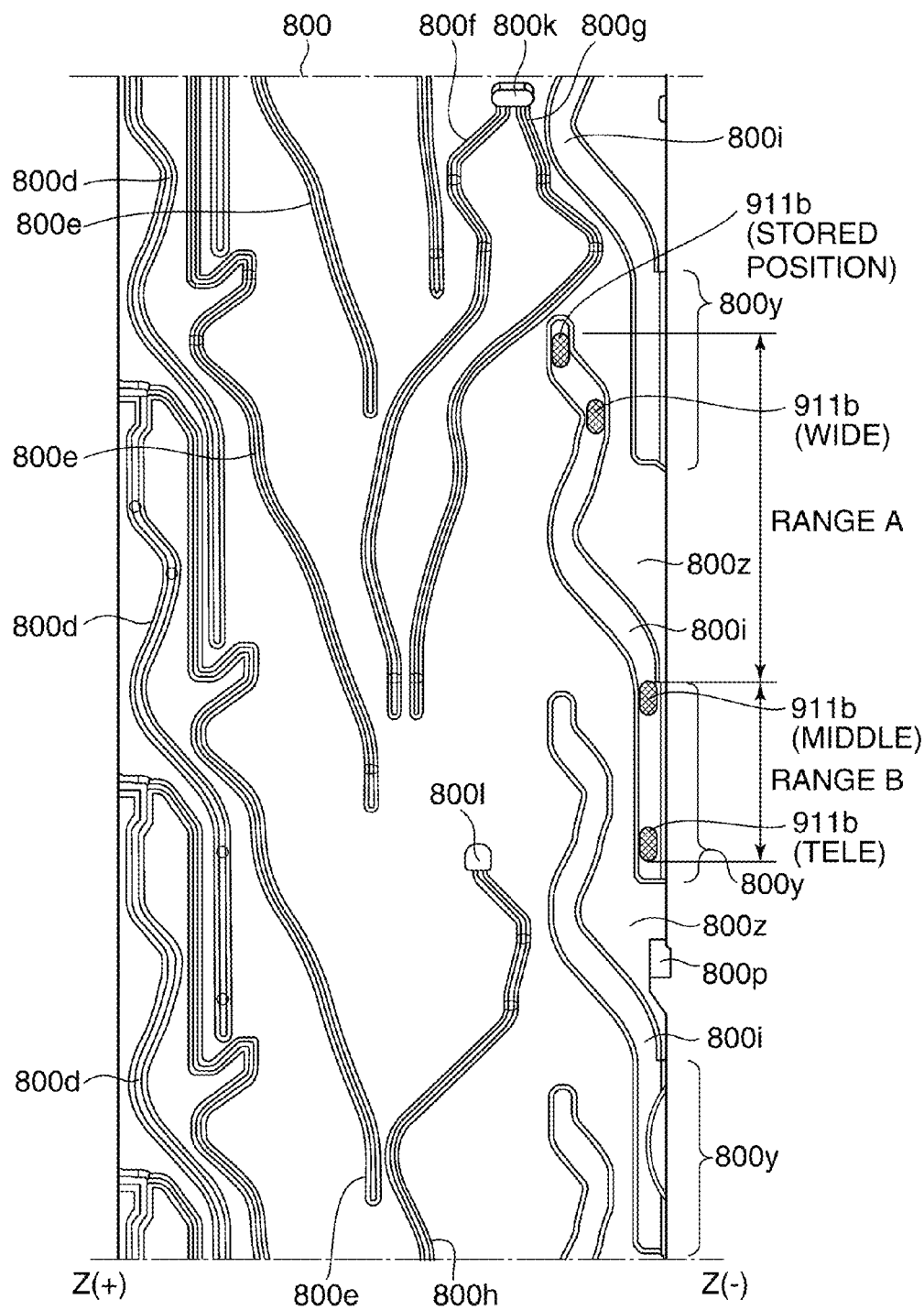
FIG. 11 is a development view of an internal peripheral side of the cam barrel of FIG. 10.

Next, the lens barrel 19 in the digital camera of FIG. 1 will be described in detail with reference to FIGS. 4 to 18. FIG. 4 is an exploded perspective view of the lens barrel 19, FIG. 5 is a perspective view of the lens barrel 19 of FIG. 4 at a stored position, FIG. 6 is a perspective view of the lens barrel 19 of FIG. 4 at an image pickup position (a TELE position), FIG. 7 is a perspective view of a first group unit 100 in FIG. 4 when the first group unit 100 is seen from an image surface side, FIG. 8 is a perspective view of a fixed barrel 700 in FIG. 4 when the fixed barrel 700 is seen from an object side, FIG. 9 is an exploded perspective view of a fifth group base unit 900 in FIG. 4, FIG. 10 is a perspective view of a cam barrel 800 in FIG. 4 when the cam barrel 800 is seen from the image surface side, and FIG. 11 is a development view of an internal peripheral side of the cam barrel 800 of FIG. 10.

As shown in FIG. 4, the lens barrel 19 has a first group unit 100, a second group unit 200, a diaphragm unit 300, a third group unit 400, a fourth group unit 600, a fixed barrel 700, a cam barrel 800, a fifth group unit 900, and a base unit 1000.

Figure 5:
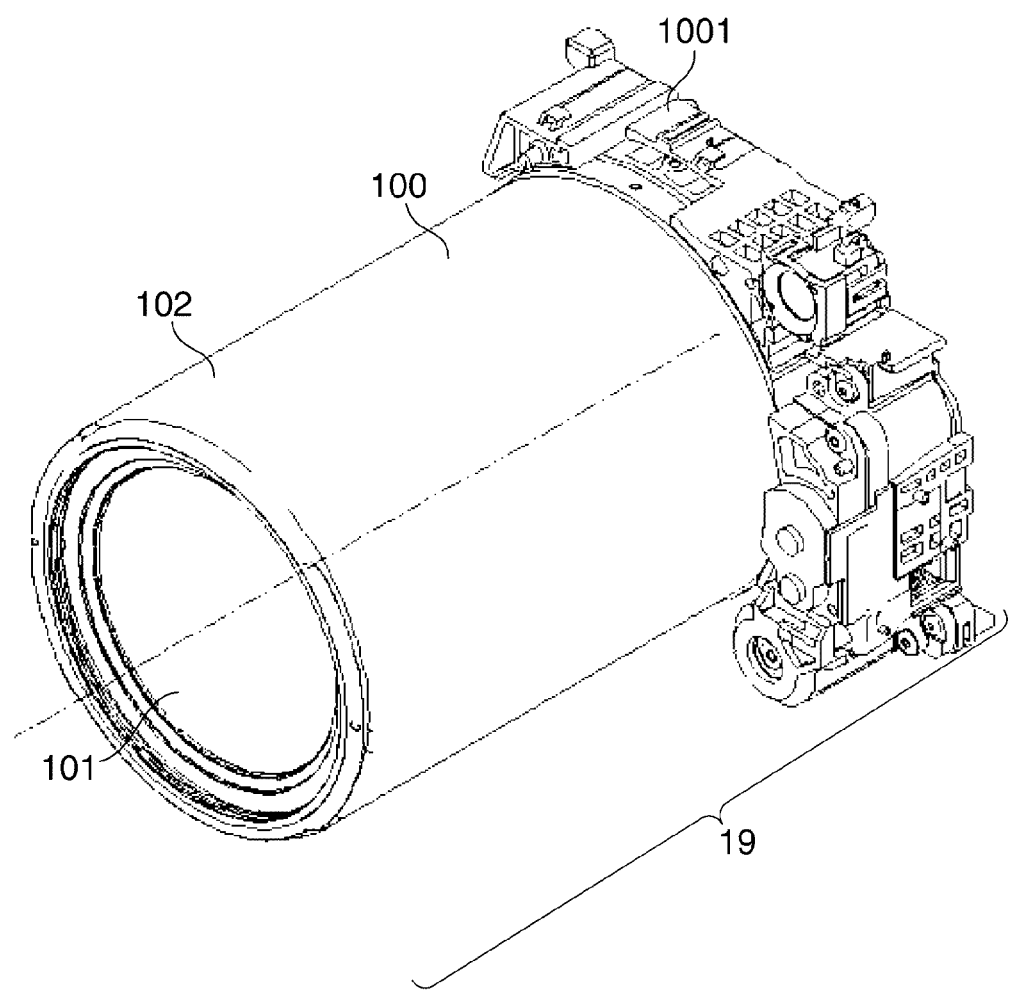
FIG. 5 is a perspective view of the lens barrel of FIG. 4 at a stored position.
Figure 6:
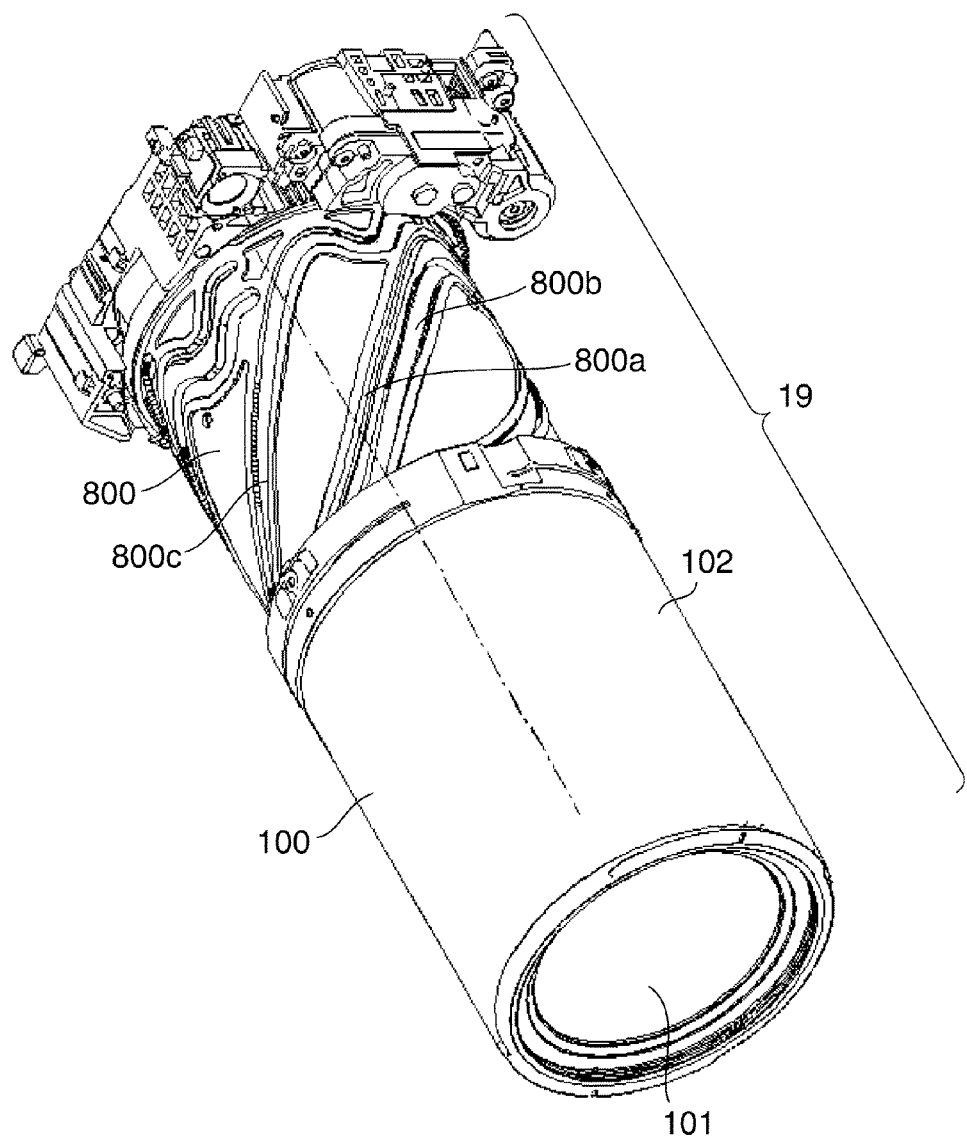
FIG. 6 is a perspective view of the lens barrel of FIG. 4 at an image pickup position (a TELE position).
Figure 7:
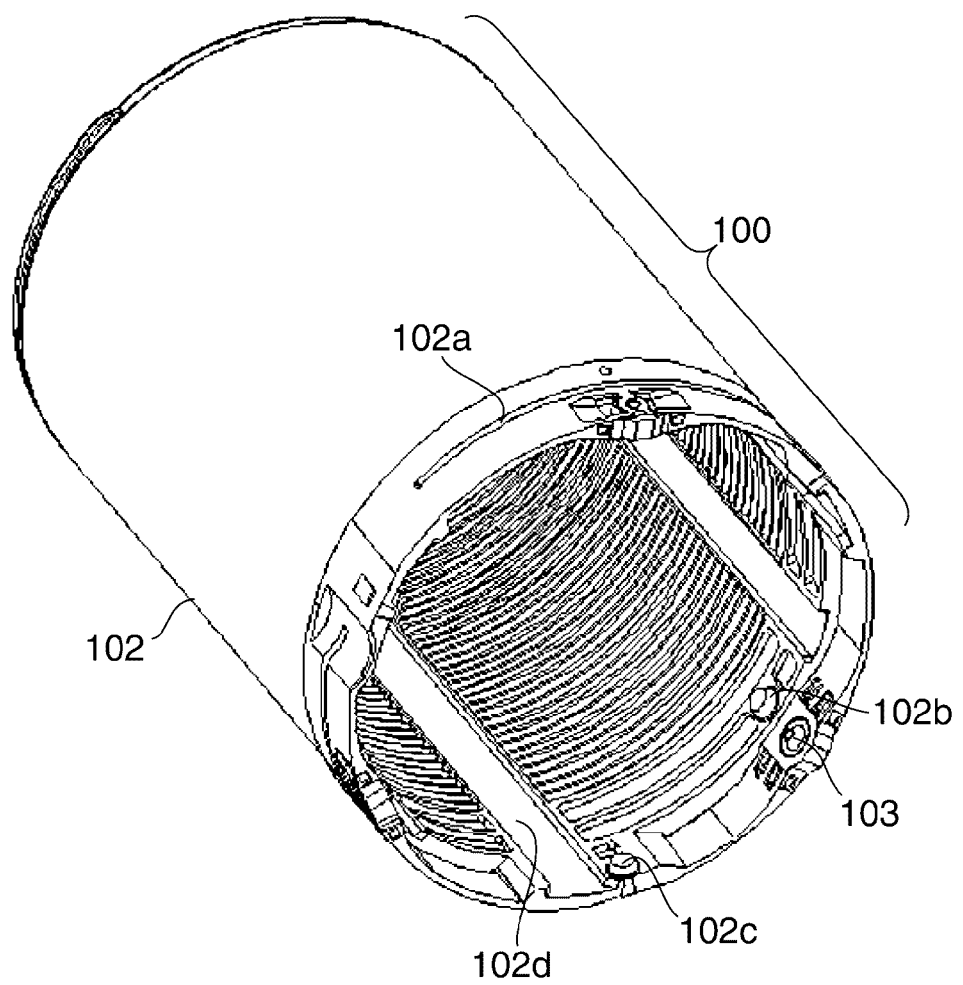
FIG. 7 is a perspective view of a first group unit in FIG. 4 when the first group unit is seen from an image surface side.

As shown in FIGS. 5 to 7, the first group unit 100 has a first group barrel 102 holding a first lens group 101. On an outer peripheral end of an image surface side of the first group barrel 102 are displayed slit holes 102a at three positions at substantially equiangular intervals in a circumference direction. On an inner peripheral end of the image surface side of the first group barrel 102 are disposed convex portions 102b, 102c, groove portions 102d extending in the optical axis direction, and cam pins 103. Convex portions 102b, convex portions 102c, groove portions 102d and cam pins 103 are disposed at three positions at substantially equiangular intervals in the circumference direction of the first group barrel 102, respectively.

As shown in FIG. 4, the second group unit 200 has a second group barrel 202 holding a second lens group 201. The second group barrel 202 has a cylindrical portion 203b with a large diameter on an object side end part thereof, and further the second group barrel 202 has cam pins 203 on an outer peripheral part of an image surface side end part thereof at three positions at substantially equiangular intervals in the peripheral direction.

As shown in FIG. 4, the diaphragm unit 300 has a main guide section 301 and a sub guide section 302. The main guide section 301 is provided with a cam pin 303.

As shown in FIG. 4, the third group unit 400 has a third group barrel 402 holding a third lens group 401, while the third group barrel 402 is held by a third group base 404 together with a driving unit 403. The third group base 404 is provided with a main guide section 404a, a sub-guide section 404c and a cam pin 405. A spring member 500 is hooked at a hook portion, not shown, of the diaphragm unit 300 and a hook portion, not shown, of the third group base 404.

As shown in FIG. 4, the fourth group unit 600 has a fourth group barrel 602 holding a fourth lens group 601. The fourth group barrel 602 is provided with a main guide section 602a, a sub-guide section 602c engaged with the third group base 404, and a cam pin 603.

The fixed barrel 700 is fixed to a base member 1001 of the base unit 1000. As shown in FIGS. 4 and 8, the fixed barrel 700 has a flange portion 700f on an object side end part thereof, and the flange portion 700f is provided with convex portions 700a with which the groove portions 102d of the first group barrel 102 is engaged. Further, the fixed barrel 700 is provided with groove portions 700b with which the cylindrical portion 203b of the second group barrel 202 is engaged, and a plurality (three in the present embodiment) of cam pins 700c. The cam pins 700c correspond to an example of the "first projection or follower portions" in the present invention.

Furthermore, the fixed barrel 700 has guide holes 700g, 700h and guide holes 700i, 700j formed therein. A guide shaft 703 is fitted in the guide holes 700g, 700h. The guide shaft 703 is fitted on the main guide section 301 of the diaphragm unit 300 and the main guide section 404a of the third group base 404 and then held at the guide holes 700g, 700h. A guide shaft 704 is fitted in the guide holes 700i, 700j. The guide shaft 704 is fitted on the sub guide section 302 of the diaphragm unit 300, the sub-guide section 404c of the third group base 404, and the main guide section 602a of the fourth group barrel 602 and then held at the guide holes 700i, 700j.

As shown in FIGS. 4 and 9, the fifth group base unit 900 has a fifth group barrel 902 holding a fifth lens group 901. The fifth group barrel 902 is provided with a main guide section 902a and a sub-guide section 902c. The fifth group barrel 902 corresponds to an example in a lens holding section in the present invention.

A guide shaft 903 is fitted on the main guide section 902a, while a guide shaft 904 is fitted on the sub-guide section 902c. Both ends of each of the guide shafts 903, 904 are held by a fifth group base 911 and a base member 1001, which are described later.

A fifth group base unit 910 has the fifth group base 911 which movably guides the fifth group barrel 902 in the optical axis direction. The fifth group base 911 is fixedly arranged relative to the base unit 1000 substantially coaxially with the fixed barrel 700, and the fifth group base 911 holds a magnet 912 and a yoke 913 which are a driving source of the fifth group barrel 902. The magnet 912 is bonded to the yoke 913, while the yoke 913 is threadably fixed to the fifth group base 911.

Further, on an outer peripheral part of the fifth group base 911 are disposed projecting portions 911b at three positions at substantially equiangular intervals in a peripheral direction of the lens barrel 19. A flank surface is formed on each of both sides of projecting portions 911b in the optical direction. The fifth group base 911 corresponds to an example of the "stopper member" of the present invention, and the projecting portions 911b correspond to the "second projection or follower portions" in the present invention.

As shown in FIG. 4, the cam barrel 800 is rotatably disposed relative to the fixed barrel 700 on an outer peripheral side of the fixed barrel 700. As shown in FIGS. 4 and 6, the cam barrel 800 has, formed on outer peripheral part thereof, cam grooves 800a with which the cam pins 103 of the first group unit 100 are engaged, and cam grooves 800b, 800c with which the convex portions 102b, 102c (FIG. 7) of the first group unit 100 are engaged respectively. The cam grooves 800a, 800b and 800c have the same locus, and predetermined gaps are disposed between a convex portion 102b and a cam groove 800b as well as between a convex portion 102c and a cam groove 800c.

As shown in FIG. 11, on an inner peripheral part of the cam barrel 800, cam grooves 800d with which the cam pins 700c of the fixed barrel 700 are engaged are formed at three positions at substantially equiangular intervals in the peripheral direction of the lens barrel 19. The cam-engagement between the cam pins 700c and the cam grooves 800d allows the cam barrel 800 to be positioned in the optical direction relative to the fixed barrel 700. The cam grooves 800d correspond to an example of the "first cam grooves" of the present invention.

Further, on the inner peripheral part of the cam barrel 800, cam grooves 800e with which the cam pins 203 of the second group unit 200 are engaged are formed at three positions in the peripheral direction of the lens barrel 19. Furthermore, a cam groove 800f with which the cam pin 303 of the diaphragm unit 300 is engaged, a cam groove 800g with which the cam pin 405 of the third group unit 400 is engaged, and a cam groove 800h with which the cam pin 603 of the fourth group unit 600 is engaged are formed in the inner peripheral part of the cam barrel 800.

Further, on the inner peripheral part of the cam barrel 800, cam grooves 800i with which the projecting portions 911b of the fifth group base 911 are engaged are formed at three positions at substantially equiangular intervals in the peripheral direction of the lens barrel. The cam grooves 800i are assumed to have the same lotus as that of the cam grooves 800d. The cam grooves 800i correspond to an example of the "second cam grooves" of the present invention.

Figure 12A:
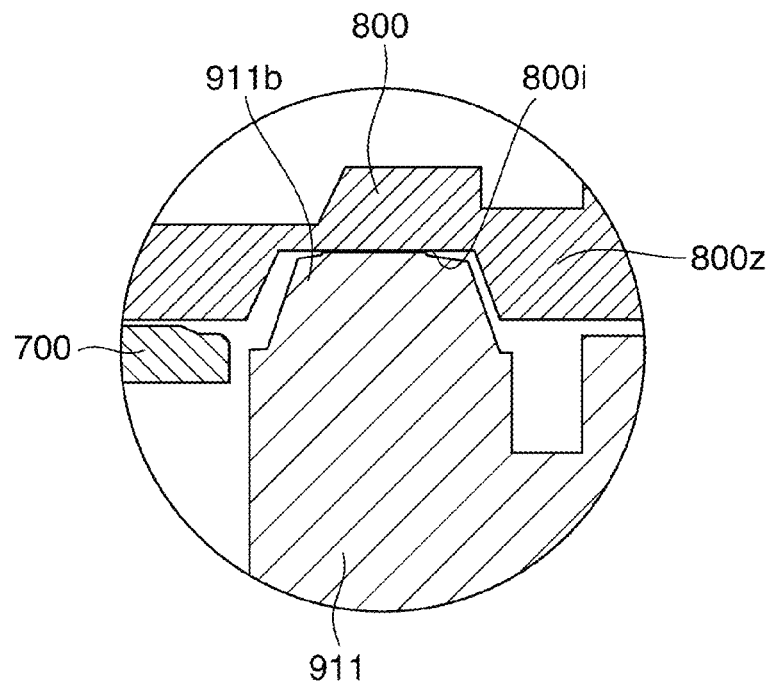
FIGS. 12A and 12B are main part sectional views which are useful in explaining a state in which a cam groove of the cam barrel of FIG. 10 and a projecting portion of the fifth group base unit of FIG. 9 are engaged with each other.
Figure 12B:
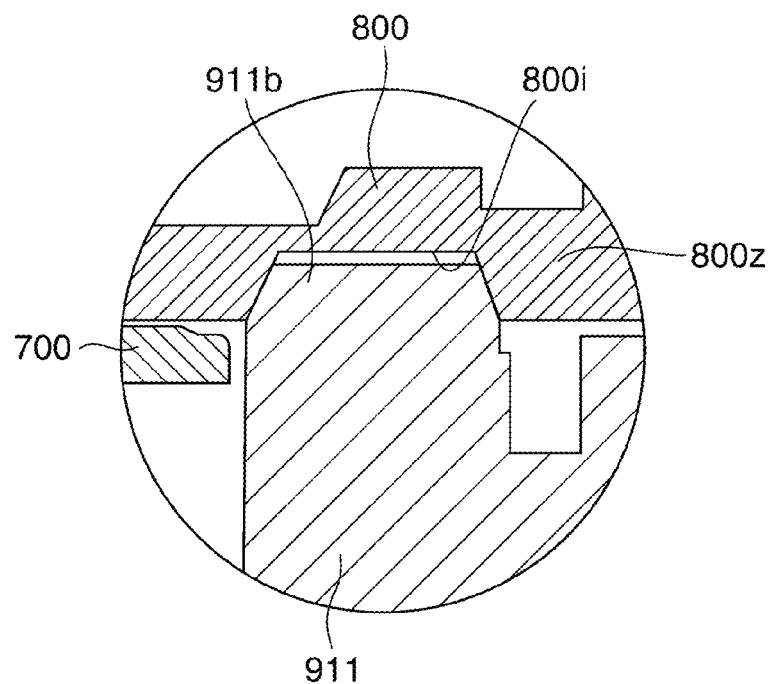

FIGS. 12A and 12B are main part sectional views which are useful in explaining a state in which a cam groove 800i of the cam barrel 800 of FIG. 10 and a projecting portion 911b of the fifth group base 911 of FIG. 9 are engaged with each other.

In the case of desiring to reduce a sliding load of the cam barrel 800 against the fixed barrel 700, the whole range of a tip part of the projecting portion 911b is brought into contact with the bottom portion of the cam groove 800i to be engaged with each other by providing gaps between the flank surfaces of the projecting portion 911b and the side walls of the cam groove 800i, as shown in FIG. 12A.

Meanwhile, in the case of desiring to position the cam barrel 800 relative to the fixed barrel 700 with a high accuracy, the flank surfaces of the projecting portion 911b are brought into contact with the cam groove 800i to be engaged with each other as shown in FIG. 12B.

FIG. 12A will be described below and FIG. 12B is similar to FIG. 12A. As shown in FIG. 12A, the tip part of the projecting portion 911b is in contact with the bottom surface of the cam groove 800i. As shown in FIG. 11, the cam grooves 800d are provided on the object side (the Z(+) side of FIG. 11) end part in an optical axis direction of the cam barrel 800, while the cam grooves 800i are provided on the image surface side (the Z(−) side of FIG. 11) end part in the optical axis direction of the cam barrel 800.

Further, as shown in FIG. 10, a gear section 800j is disposed on the outer peripheral part of an image surface side end part of the cam barrel 800. Furthermore, as shown in FIG. 11, a hole portion 800k for incorporating the cam pins 303, 405 and a hole portion 800l for incorporating the cam pin 603 are formed in the cam barrel 800.

A rib portion 800p is disposed on the image surface side end part of the cam barrel 800. The rib portion 800p is for detecting the position of the cam barrel 800 in the optical direction by optically screening a photo sensor, not shown, which is attached to the base member 1001 of the base unit 1000. Further, the rib portion 800p is arranged at a position sandwiched by the two cam grooves 800i in the peripheral direction of the lens barrel 19 and overlapped with the cam grooves 800i in the optical axis direction, thereby eliminating the need for arranging the rib portion 800p closer to the image surface side than the cam grooves 800i, which makes it possible to shorten the whole length of the cam barrel 800 to reduce the size of the lens barrel.

The base unit 1000 has the base member 1001, and the base member 1001 holds the guide shafts 903, 904. To the base member 1001 are attached the image pickup device 8, the photo sensor, not shown, or the like.

Figure 13:
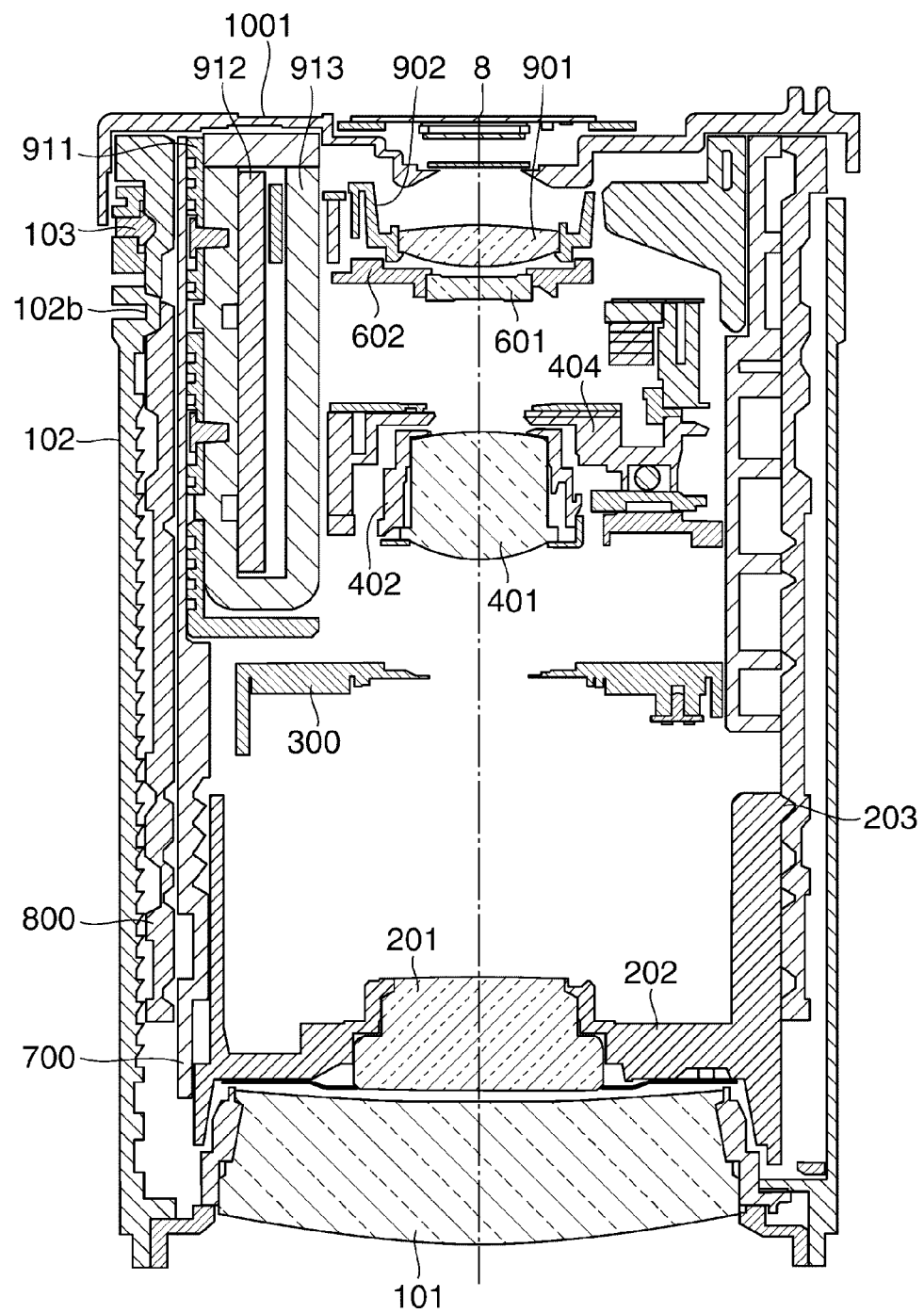
FIG. 13 is a sectional view of the lens barrel of FIG. 4 at the stored position.
Figure 14:
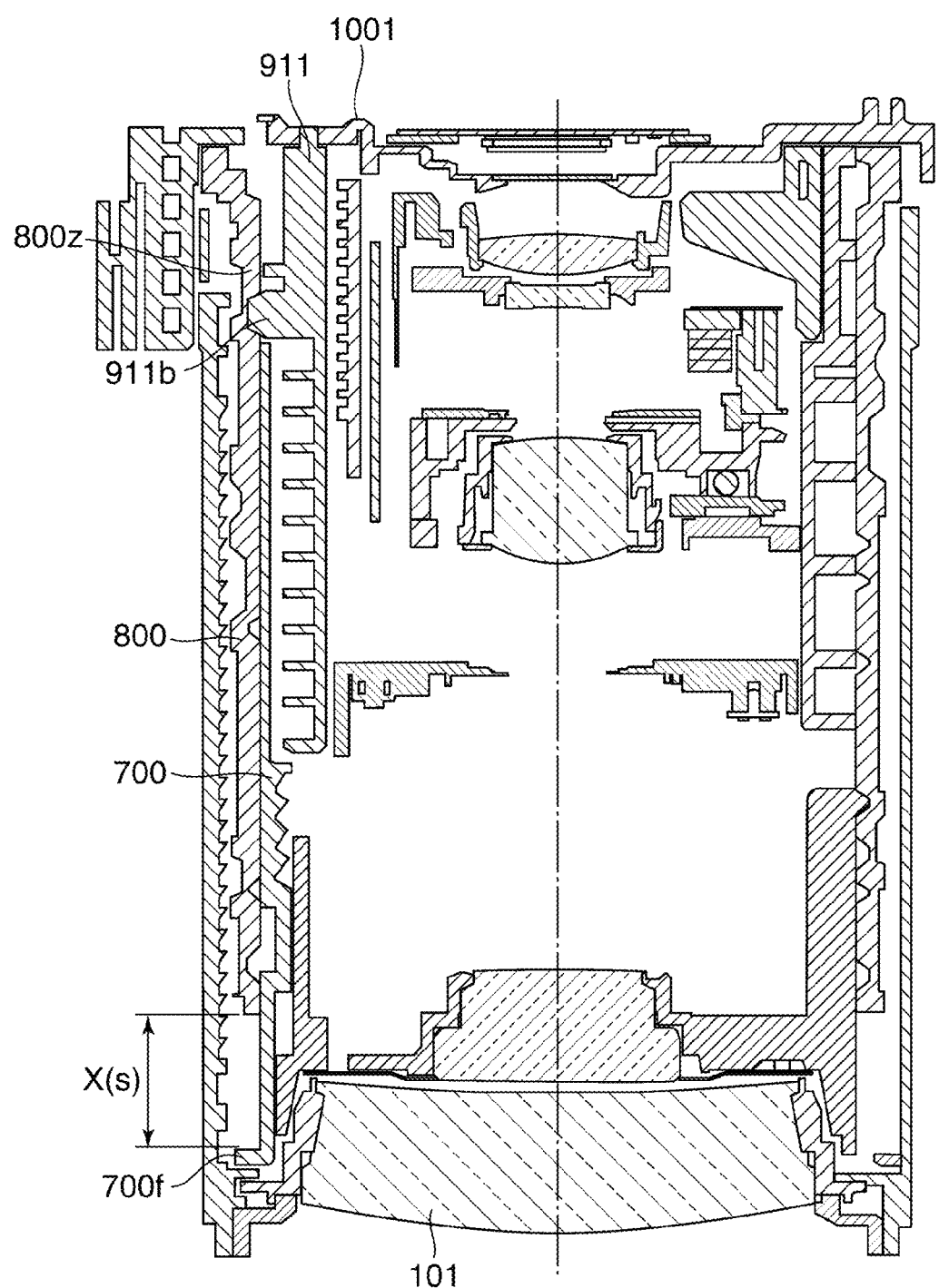
FIG. 14 is a sectional view of the lens barrel of FIG. 4 at the stored position in a phase different from the phase of FIG. 13.
Figure 15:
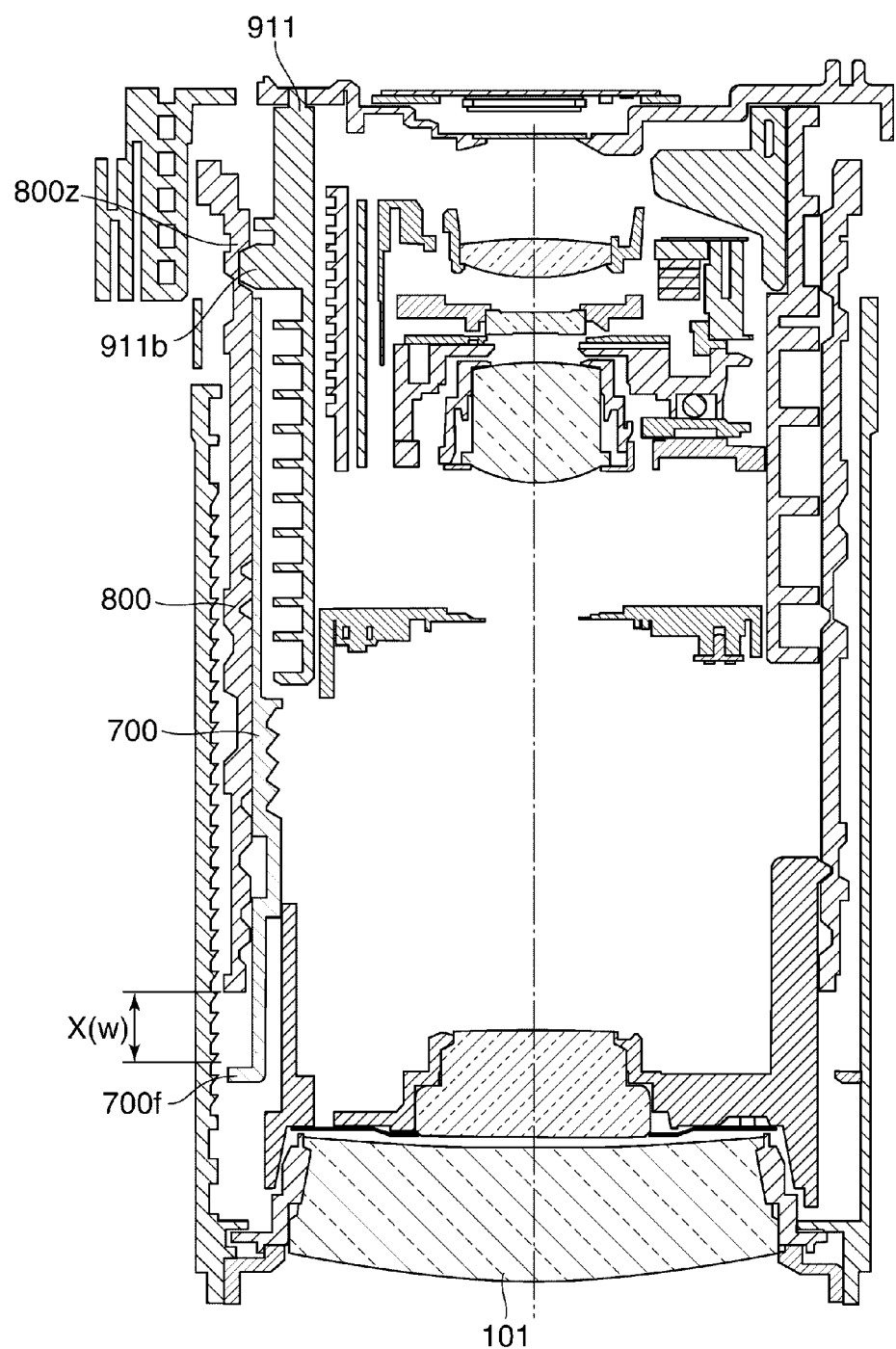
FIG. 15 is a sectional view of the lens barrel of FIG. 4 at an image pickup position (a WIDE position).
Figure 16:
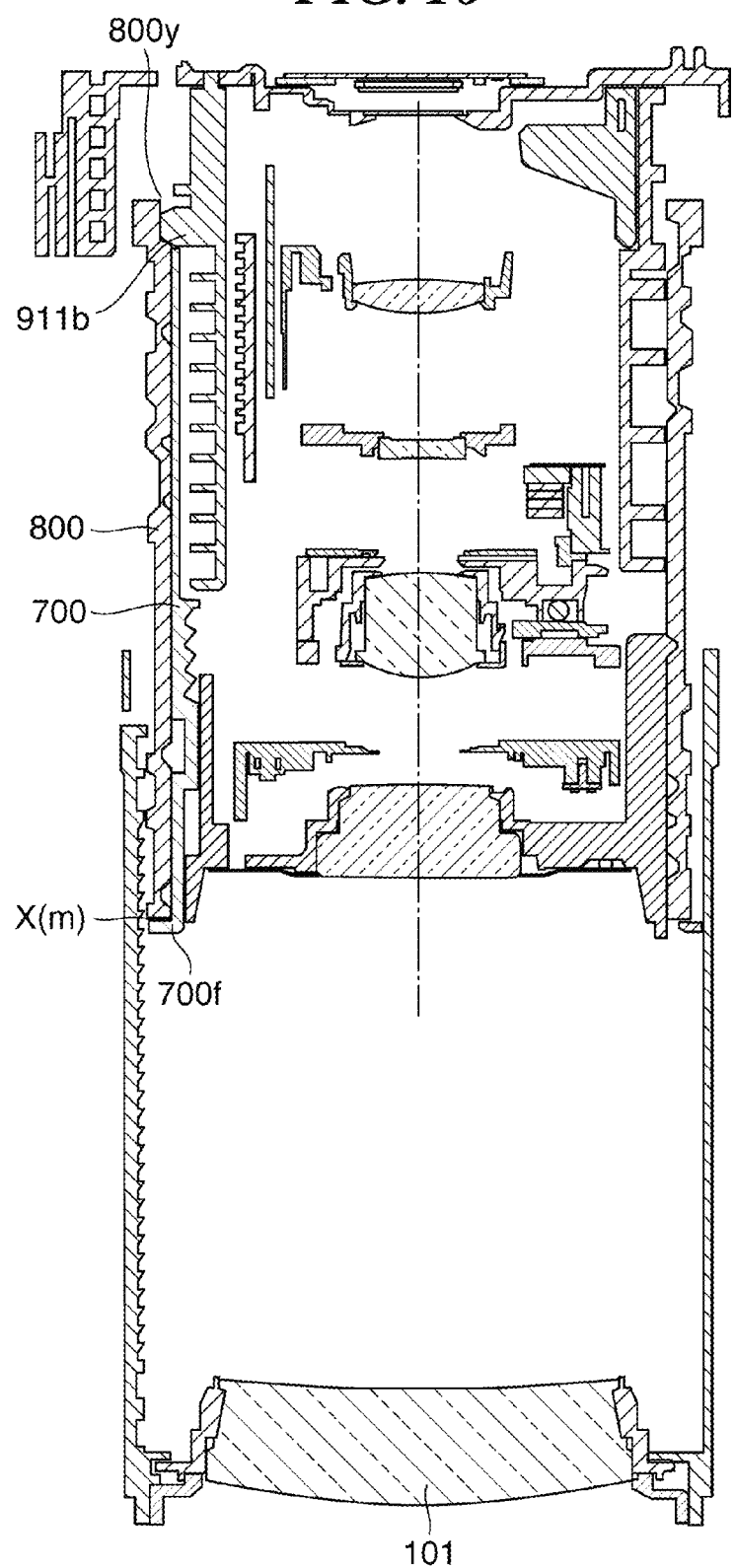
FIG. 16 is a sectional view of the lens barrel of FIG. 4 at an image pickup position (a MIDDLE position).
Figure 17:
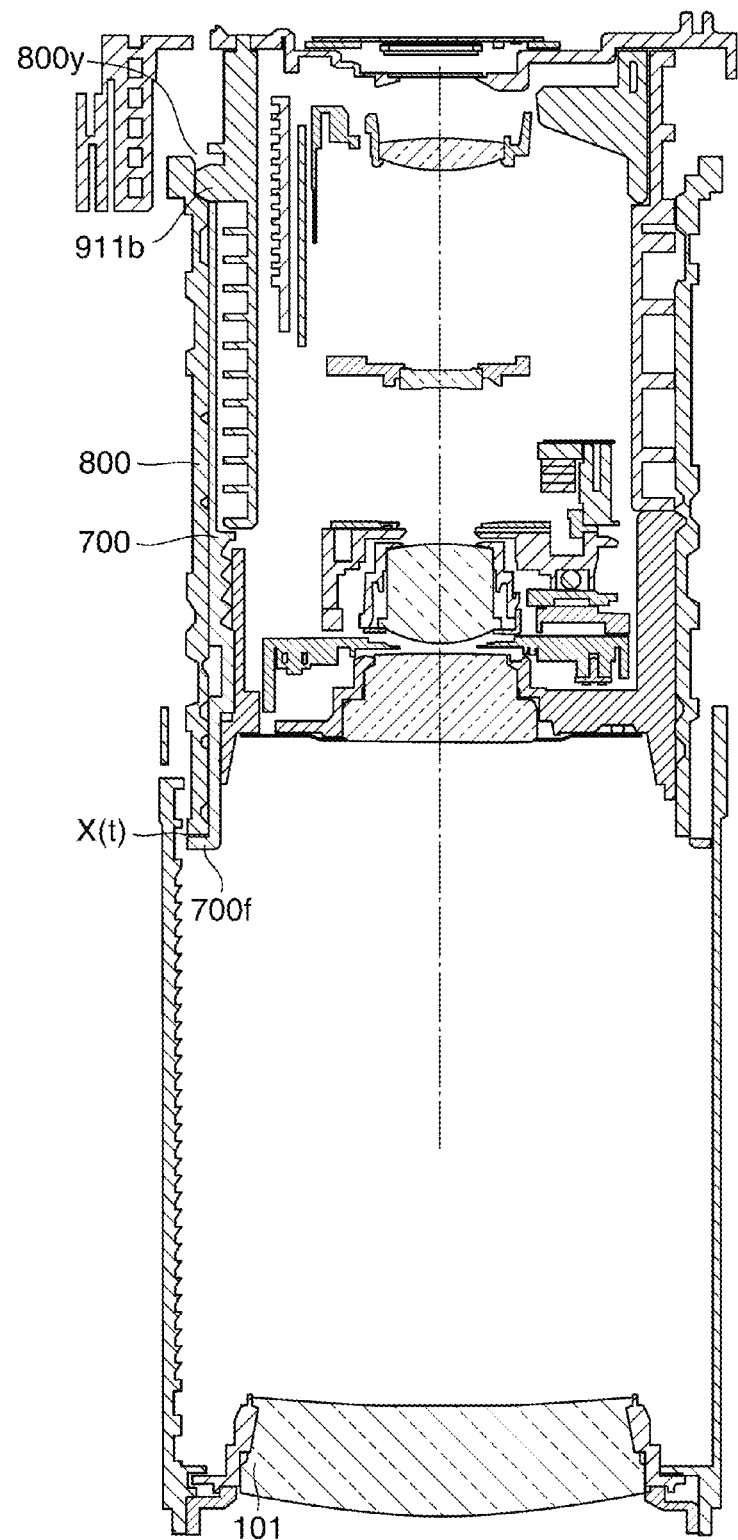
FIG. 17 is a sectional view of the lens barrel of FIG. 4 at an image pickup position (a TELE position).
Figure 18A:
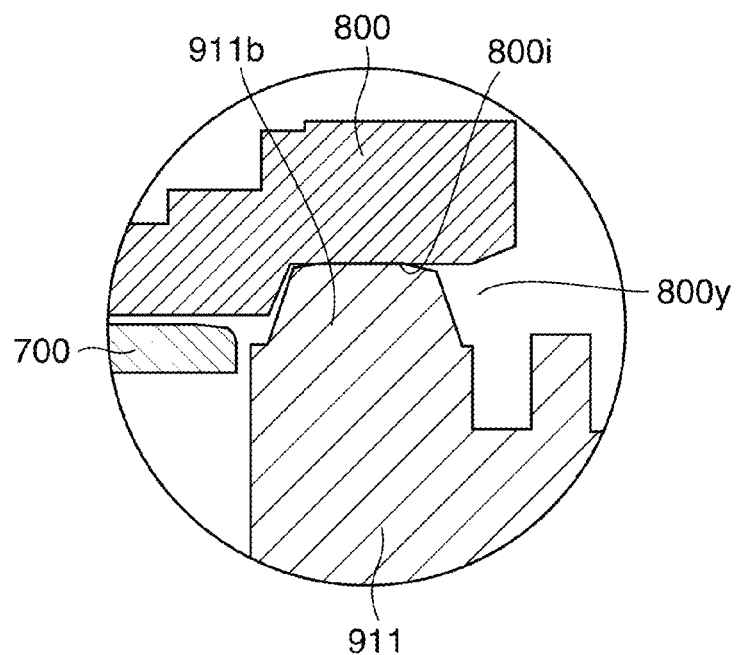
FIGS. 18A and 18B are main part sectional views showing the engagement between a cam groove of the cam barrel of FIG. 10 and projecting portions of the fifth group base unit of FIG. 9.
Figure 18B:
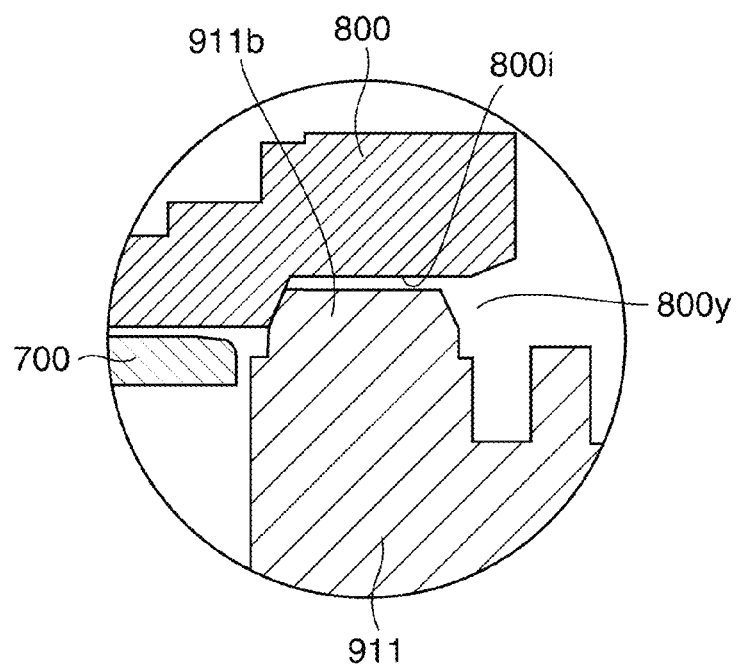

Next, a zoom operation of the lens barrel 19 in the digital camera of FIG. 1 will be described with reference to FIGS. 11 to 18. FIG. 13 is a sectional view of the lens barrel 19 of FIG. 4 at the stored position, FIG. 14 is a sectional view of the lens barrel 19 at the stored position in a phase different from the phase of FIG. 13, FIG. 15 is a sectional view of the lens barrel 19 of FIG. 4 at a first image pickup position (a WIDE position), FIG. 16 is a sectional view of the lens barrel 19 of FIG. 4 at a second image pickup position (a MIDDLE position), FIG. 17 is a sectional view of the lens barrel 19 of FIG. 4 at a third image pickup position (a TELE position), and FIG. 18 is a main part sectional view showing the engagement between a cam groove 800i of the cam barrel 800 of FIG. 10 and projecting portions 911b of the fifth group base unit 910 of FIG. 9 at the MIDDLE position and the TELE position.

When a torque of the driving source, not shown, is transmitted to the gear section 800j to rotate the cam barrel 800, the cam barrel 800 rotatingly moves in the optical axis direction along the cam lotuses of the cam grooves 800d because the cam pins 700c of the fixed barrel 700 are engaged with the cam grooves 800d of the cam barrel 800.

In FIG. 11, a range A is an area from the stored position up to the MIDDLE position between the WIDE position and the TELE position. The positional relationship among lenses differs at the WIDE position, the MIDDLE position and the TELE position. Further, a range B is an area from the MIDDLE position up to the TELE position.

In the range A, the flank surfaces of the projecting portions 911b of the fifth group base 911 are being able to be in contact with the opposite side wall portions (the Z(+) and Z(−) sides of FIG. 11) of the cam grooves 800i of the cam barrel 800 in the optical axis direction, as shown in 12A. Further, in the range B, the flank surface of the projecting portions 911b of the fifth group base 911 are being able to be in contact only with the side wall portion on the object side (the Z(+) side of FIG. 11) of the cam grooves 800i of the cam barrel 800 in the optical axis direction as shown in 18A. It should be noted that the state of FIG. 12B is similar to the state of FIG. 18B.

In the range B shown in FIG. 11, the cam barrel 800 is extended closest to the object side relative to the fixed barrel 700 and rotates at a substantially fixed position. Therefore, the cam barrel 800 comes closest to the flange portion 700f on the object side end part of the fixed barrel 700. Thereby, the flange portion 700f of the fixed barrel 700 plays a role of receiving external pressure on the cam barrel 800 in the object direction (the Z(+) direction of FIG. 11) and prevents the cam barrel 800 from falling from the fixed barrel 700. Further, in the Z(−) direction in the range B, the projecting portions 911b of the fifth group base 911 play a role of receiving external pressure on the cam barrel 800 and prevents the cam barrel 800 from falling from the fixed barrel 700.

Meanwhile, in the range A shown in FIG. 11, the projecting portions 911b of the fifth group base 911 play a role of receiving external pressure on the cam barrel 800 in both of the Z(+) and Z(−) directions and prevents the cam barrel 800 from falling from the fixed barrel 700, which makes it possible to provide the lens barrel 19 excellent in impact resistance.

Here, when the gap between the flange portion 700f of the fixed barrel 700 and the cam barrel 800 at the stored position, the WIDE position, the MIDDLE position and the TELE position are indicated by X(s), X(w), X(m) and X(t),respectively, X(s)≤X(w)<X(m)=X(t) holds (FIGS. 14 to 17).

Therefore, in the range B, it is not necessary to provide a side wall portion 800z on the image surface side (the Z(−) side of FIG. 11) of the cam grooves 800i of the cam barrel 800 in the optical direction, which shortens the whole length of the cam barrel 800, and makes it possible to incorporate the fifth group unit 900 having the projecting portions 911b from the image surface side (the Z(−) side of FIG. 11) using an open portion 800y of a cam groove 800i of the cam barrel 800 as an introduction opening. This eliminates the need for forming a hole portion for incorporation in the cam barrel 800 as before to increase the degree of freedom of arranging the cam grooves, which makes it possible to decrease the size of the cam barrel 800.

Rotation of the cam barrel 800 allows the first group unit 100 to move in the optical axis direction by the cam pins 103 following the cam grooves 800a disposed on an outer peripheral side of the cam barrel 800. The convex portions 102b of the first group unit 100 are engaged with the cam grooves 800b of the cam barrel 800 securing a gap therebetween, and the convex portions 102c are engaged with the cam grooves 800c of the cam barrel 800 securing a gap therebetween. At this time, the groove portions 102d of the first group barrel 102 and the convex portions 700a of the fixed barrel 700 are engaged with each other, and the first group unit 100 rectilinearly moves in the optical axis direction with the rotation controlled.

The cam pins 203 are engaged with the cam grooves 800e of the cam barrel 800, and the second group unit 200 moves in the optical axis direction along the cam lotus of the cam grooves 800e. At this time, the cylindrical portion 203b of the second group barrel 202 and the groove portions 700b of the fixed barrel 700 are engaged with each other, and the second group unit 200 rectilinearly moves in the optical axis direction with the rotation controlled.

The cam pin 303 is engaged with the cam groove 800f of the cam barrel 800, and the diaphragm unit 300 moves in the optical axis direction along the cam lotus of the cam grooves 800f. At this time, the main guide section 301 of the diaphragm unit 300 is fitted on the guide shaft 703, and the sub guide section 302 is fitted on the guide shaft 704. The diaphragm unit 300 rectilinearly moves in the optical axis direction with the rotation controlled.

The cam pin 405 is engaged with the cam groove 800g, and the third group unit 400 moves in the optical axis direction along the cam lotus of the cam groove 800g. At this time, the main guide section 404a of the third group base 404 is fitted on the guide shaft 703, and the sub-guide section 404c is fitted on the guide shaft 704. The third group unit 400 rectilinearly moves in the optical axis direction with the rotation controlled.

The cam pin 603 is engaged with the cam groove 800h of the cam barrel 800, and the fourth group unit 600 moves in the optical axis direction along the cam lotus of the cam groove 800h. At this time, the main guide section 602a of the fourth group barrel 602 is fitted on the guide shaft 704, the sub-guide section 602c is engaged with the third group base 404. The fourth group unit 600 rectilinearly moves in the optical axis direction with the rotation controlled.

The fifth group unit 900 is rotation-controlled by the guide shafts 903, 904 and is driven to a predetermined position in the optical axis direction by the driving source comprising the magnet 912 and the yoke 913.

As described above, the first group unit 100, the second group unit 200, the diaphragm unit 300, the third group unit 400, the fourth group unit 600 and the fifth group unit 900 move in the optical axis direction to implement a zoom operation as shown in FIGS. 13 to 17.

As described above, according to the embodiment of the present invention, it is possible to secure excellent impact resistance of the lens barrel 19 without increasing the size of the lens barrel 19.

It should be noted that the configuration of the present invention is not limited to that exemplified in the above embodiment, and the material, shapes, dimensions, forms, the number, arrangement positions or the like can be appropriately changed within a range not departing from the spirit of the present invention.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-172545, filed Aug. 27, 2014 which is hereby incorporated by reference herein in its entirety.

What is claimed is:

1. A lens barrel that changes image pickup magnification by a lens moving in an optical axis direction of the lens barrel between a stored position and an image pickup position, the lens barrel comprising:
 a fixed barrel having a plurality of first projection or follower portions on an outer peripheral part thereof and having a flange portion on an object side-outer peripheral end thereof;
 a stopper member fixedly arranged coaxially with the fixed barrel and having a plurality of second projection or follower portions, each of which having flank surfaces at both ends thereof in the optical axis direction; and
 a cam barrel disposed on an outer peripheral side of the fixed barrel and the stopper member, having a plurality of first cam grooves with which the plurality of the first projection or follower portions are cam-engaged, respectively, on an inner peripheral part thereof, and having a plurality of second cam grooves, with which the plurality of the second projection or follower portions are engaged, respectively, on the inner peripheral part thereof, at a position toward an image surface side away from the first cam grooves in the optical axis direction, the plurality of second cam grooves having the same locus as that of the plurality of first cam grooves and rotatingly moving in the optical axis direction relative to the fixed barrel and the stopper member due to the engagement between the first projection or follower portions and the first cam grooves and the engagement between the second projection or follower portions and the second cam grooves,
 wherein in an area where the cam barrel is extended to the object side and is close to the flange portion of the fixed barrel, side walls of the plurality of the second cam grooves with which the plurality of the second projection or follower portions are engaged, respectively, are open on the image surface side of the plurality of the second cam grooves.

2. The lens barrel according to claim 1, wherein in the area where the cam barrel is extended to the object side and is close to the flange portion of the fixed barrel, the second projection or follower portions are in contact with the bottom portions of the second cam grooves, and each of the flank surfaces of the second projection or follower portions is arranged with a gap relative to the side walls of the second cam grooves on the object side.

3. The lens barrel according to claim 1, wherein in the area where the cam barrel is extended to the object side and is close to the flange portion of the fixed barrel, the flank surfaces of the second projection or follower portions are arranged in contact with the side walls of the second cam grooves on the object side.

4. The lens barrel according to claim 1, wherein a rib portion for detecting a position of the cam barrel in the optical axis direction is disposed on an image surface side end part of the cam barrel, and the rib portion is arranged at a position sandwiched by two of the second cam grooves in a peripheral direction and overlapped with the second cam grooves in the optical axis direction.

5. The lens barrel according to claim 1, wherein the image pickup position includes a first image pickup position in which the lens is extended to the object side from the stored position, a second image pickup position in which the lens is extended further to the object side from the first image pickup position, and a third image pickup position in which the lens is extended much further to the object side from the second image pickup position; and,
 wherein the cam barrel is closest to the flange portion at the third image pickup position, and in an area from the second image pickup position to the third image pickup position, the cam barrel rotates at a substantially fixed position relative to the fixed barrel.

6. The lens barrel according to claim 1, wherein the stopper member movably guides a lens holding section configured to hold the lens in the optical axis direction.

7. The lens barrel according to claim 6, wherein the stopper member holds a driving source configured to drive the lens holding section in the optical axis direction.

8. An image pickup apparatus comprising a zoom type lens barrel that changes image pickup magnification by a lens moving in an optical axis direction of the lens barrel between a stored position and an image pickup position,
 the lens barrel comprising:
 a fixed barrel having a plurality of first projection or follower portions on an outer peripheral part thereof and having a flange portion on an object side-outer peripheral end thereof;
 a stopper member fixedly arranged coaxially with the fixed barrel and having a plurality of second projection or follower portions, each of which having flank surfaces at both ends thereof in the optical axis direction; and
 a cam barrel disposed on an outer peripheral side of the fixed barrel and the stopper member, having a plurality of first cam grooves with which the plurality of the first projection or follower portions are cam-engaged, respectively, on an inner peripheral part thereof, and having a plurality of second cam grooves, with which the plurality of the second projection or follower portions are engaged, respectively, on the inner peripheral part thereof, at a position toward an image surface side away from the first cam grooves in the optical axis direction, the plurality of second cam grooves having the same locus as that of the plurality of first cam grooves and rotatingly moving in the optical axis direction relative to the fixed barrel and the stopper member due to the engagement between the first projection or follower portions and the first cam grooves and the engagement between the second projection or follower portions and the second cam grooves,
 wherein in an area where the cam barrel is extended to the object side and is close to the flange portion of the fixed barrel, side walls of the plurality of the second cam grooves with which the plurality of the second projection or follower portions are engaged, respectively, are open on the image surface side of the plurality of the second cam grooves.

\* \* \* \* \*